US012229303B2

(12) United States Patent
Scott et al.

(10) Patent No.: US 12,229,303 B2
(45) Date of Patent: Feb. 18, 2025

(54) SYSTEM AND METHOD FOR PROCESSING ERASURE REQUESTS

(71) Applicant: SHOPIFY INC., Ottawa (CA)

(72) Inventors: Steven Scott, Ottawa (CA); Jason White, Ottawa (CA); Reid Van Melle, Ottawa (CA)

(73) Assignee: SHOPIFY INC., Ottawa (CA)

( * ) Notice: Subject to any disclaimer, the term of this patent is extended or adjusted under 35 U.S.C. 154(b) by 802 days.

(21) Appl. No.: 16/953,535

(22) Filed: Nov. 20, 2020

(65) Prior Publication Data

US 2022/0164469 A1    May 26, 2022

(51) Int. Cl.
*G06F 21/62* (2013.01)
*G06F 9/48* (2006.01)
*G06Q 30/0601* (2023.01)

(52) U.S. Cl.
CPC ........ *G06F 21/6245* (2013.01); *G06F 9/4881* (2013.01); *G06Q 30/0641* (2013.01)

(58) Field of Classification Search
CPC .............. G06F 21/6245; G06F 9/4881; G06F 2221/2143; G06Q 30/0641
See application file for complete search history.

(56) References Cited

U.S. PATENT DOCUMENTS

| | | | |
|---|---|---|---|
| 2015/0220751 A1* | 8/2015 | Syben ................. | G06F 11/1471 713/193 |
| 2018/0107701 A1* | 4/2018 | Boehme .............. | G06F 16/2358 |
| 2019/0065562 A1* | 2/2019 | Kumar ................ | G06F 16/2471 |
| 2019/0065748 A1* | 2/2019 | Foster ................... | G06Q 50/01 |
| 2021/0072917 A1* | 3/2021 | Surla ...................... | G06F 3/0647 |
| 2021/0383370 A1* | 12/2021 | Tippets ................ | G06Q 20/383 |
| 2022/0164772 A1* | 5/2022 | Fabritius ................ | G06Q 10/10 |

* cited by examiner

*Primary Examiner* — Michael Simitoski
*Assistant Examiner* — Andrew Suh

(57) ABSTRACT

Systems and methods for processing erasure requests are provided, namely requests from users to have their user data erased from a system. The system maintains user data in multiple components which may not be in communication with each other. With the provided system, certain entities, referred to herein as erasure control entities, are informed of details of received erasure requests, and are given the opportunity to provide input on whether they should be executed or note. For example, one erasure control entity, such as a credit card server, may not want an erasure request executed for a user with a large outstanding debt, while another erasure control entity, such as a legal component, may be unaware of this and may not be concerned with the erasure request being executed. The system and method ensure that erasure requests are not executed in situations that are premature or inappropriate.

21 Claims, 12 Drawing Sheets

| E-Commerce Platform | Q Search | JG John's Apparel / Jonny B. Good |
|---|---|---|
| ⌂ Home | Good afternoon, Jonny B.. | All channels ⌄    Today ⌄ |
| ⇄ Orders | Here's what's happening with your store today. | TOTAL SALES    Jun 1 |
| ⌂ Products | | $98.00    2 orders |
| ○+ Customers | Today's total sales    Today's visits | $125 |
| ⊞ Reports | $98.00    1 | $75 |
| ⚙ Discounts | | $25 |
| ⊞ Apps | ● Update your Platform Payments tax details | 12am   4pm   8pm   11pm |
| SALES CHANNELS ⊕ | We require additional information to verify your identity. | TOTAL SALES BY CHANNEL    View dashboard |
| ⊟ Online Store | [Update tax details] | Online Store    Jun 1 |
| □ Mobile App | | $0.00    0 orders |
| View all channels | ● Advanced Cash on Delivery has been deactivated for your store | Mobile app    0 orders |
| | [See why] | $0.00 |
| | | Shopify POS (126 York St.)    0 orders |
| ⚙ Settings | | $0.00 |

FIG. 2

SYSTEM AND METHOD FOR PROCESSING ERASURE REQUESTS

FIELD

The application relates to distributed data storage systems, and, more particularly, to systems and methods for controlling and coordinating data erasure processing in distributed data storage systems.

BACKGROUND

Organizations such as those providing e-commerce platforms may store significant amounts of user data. Various regulatory frameworks are in place that address the rights of users to have their data forgotten. For example, the General Data Protection Regulation (GDPR) is a European Union (EU) regulatory framework that defines the rights of "data subjects", responsibilities when transferring data across borders, general provisions and principles, and penalties.

Historically, companies use data infrastructure in order to NOT forget data. Now they are being told that when asked to forget data, they must. Also known as the right to erasure, when any individual asks an organization to remove all of their personally identifiable information (PII) from their data systems, that organization has a time limit—usually 30 days in the case of the GDPR, for example—to do so, document the deletion, and inform the requestor that the "erasure" has been completed.

Meanwhile, companies continue to create and store more data (both structured and unstructured) than ever. The ways in which they have historically managed this data makes it difficult to simply erase. They need to perform this erasure:
  across various systems
  for structured and unstructured data
  in backups, such as image based backups.

To complicate matters further, not all erasure requests can be complied with for various reasons. Examples of reasons a given erasure request cannot not be complied with include a pending lawful access request pertaining to the data to be erased, an open letter of credit or other obligation associated with the data, erroneous deletion request, request not applicable to a data subset, etc.

These frameworks, or other frameworks, may also give users the rights to obtain a copy of all of their personal information that is stored by an organization in response to a data access request. Issues with responding to data access requests are similar to those in responding to erasure requests, as first all of the relevant data must be located.

SUMMARY

Systems and methods for processing erasure requests are provided, namely requests from users to have their user data erased from a system. The system maintains user data in multiple components which may not be in communication with each other. With the provided system, certain entities, referred to herein as erasure control entities, are informed of details of received erasure requests, and are given the opportunity to provide input on whether they should be executed or not. For example, one erasure control entity, such as a credit card server, may not want an erasure request executed for a user with a large outstanding debt, while another erasure control entity, such as a legal component, may be unaware of this and may not be concerned with the erasure request being executed. The system and method ensure that erasure requests are not executed in situations that are premature or inappropriate.

According to one aspect of the present invention, there is provided a method comprising: receiving an erasure request pertaining to a user identifier, to erase data in a system that maintains user data in a plurality of components; making at least some details of the request available to at least one erasure control entity; determining how to handle the request based on one or a combination of: input received from one or more of the least one erasure control entity, and lack of input received from one or more of the at least one erasure control entity; based on this determining, further processing the erasure request.

In some embodiments, the at least one erasure control entity comprises a plurality of erasure control entities, the plurality of erasure control entities including at least one erasure control entity of each of two levels, wherein making at least some details of the request available to at least one erasure control entity comprises: first making at least some details of the request available to the at least one erasure control entity of a first level of said at least two levels; based on input or lack of input from the at least one erasure control entity of the first level, determining whether the erasure request can be executed from the perspective of the at least one erasure control entity for the first level; for each subsequent level of said at least two levels, upon determining that the erasure request can be executed from the perspective of the at least one erasure control entity of a given level immediately preceding the subsequent level, making at least some details of the request available to the at least one erasure control entity for the subsequent level of said at least two levels and determining whether the erasure request can be executed from the perspective of the at least one erasure control entity of the subsequent level; and executing the erasure request when it is determined the erasure request can be executed from the perspective of all levels of erasure control entity.

In some embodiments, the method further comprises: processing the erasure request separately for each of at least two contexts to reach a respective determination of how to handle the erasure request for each context.

In some embodiments, the system is an e-commerce system, and processing the erasure request separately for each of at least two contexts to reach a respective determination of how to handle the erasure request for each context comprises processing the request for a first context where a user having the user ID is interacting with the system as a merchant, and a second context where the user having the user ID is interacting with the system as a customer.

In some embodiments, making at least some details available comprises one or a combination of two or more of: making the details available to be pulled by at least one erasure control entity; publishing the details request in a secure manner for access by at least one erasure control entity; storing the details in association with a link, and making the link available at least one erasure control entity; and making the details available to an erasure control entity that has performed a registration procedure.

In some embodiments, determining how to handle the request comprises selecting between a set of options that includes at least two of: allowing the erasure request to proceed in its entirety; complete cancellation of the erasure request; interjecting a hold on the erasure request of a specified time duration after which the request can proceed; interjecting a hold on the erasure request of a specified time duration after which one or more control entities must again be surveyed; or allowing erasure by certain components, but not others.

In some embodiments, determining how to handle the request comprises: proceeding with the erasure request in its entirety unless at least one of the erasure control entity has responded within a specified time frame to indicate this should not occur.

In some embodiments, further processing the erasure request comprises: transmitting a respective task to each component.

In some embodiments, further processing the erasure request comprises: transmitting an erase user task to each component to erase data associated with the user ID; and transmitting a purge store task to each component to purge a store associated with the user ID.

According to another aspect of the present invention, there is provided an apparatus comprising: an erasure orchestration component configured to: receive an erasure request pertaining to a user identifier, to erase data in a system that maintains user data in a plurality of components; make at least some details of the request available to at least one of a plurality of erasure control entities; determine how to handle the request based on one or a combination of: input received from one or more of the least one erasure control entity, and lack of input received from one or more of the at least one erasure control entity; based on this determining, further process the erasure request.

In some embodiments, the at least one erasure control entity comprises a plurality of erasure control entities, the plurality of erasure control entities including at least one erasure control entity of each of two levels, wherein the erasure orchestration component makes at least some details of the request available to at least one erasure control entity by: first making at least some details of the request available to the at least one erasure control entity of a first level of said at least two levels; based on input or lack of input from the at least one erasure control entity of the first level, determining whether the erasure request can be executed from the perspective of the at least one erasure control entity for the first level; for each subsequent level of said at least two levels, upon determining that the erasure request can be executed from the perspective of the at least one erasure control entity of a given level immediately preceding the subsequent level, making at least some details of the request available to the at least one erasure control entity for the subsequent level of said at least two levels and determining whether the erasure request can be executed from the perspective of the at least one erasure control entity of the subsequent level; and executing the erasure request when it is determined the erasure request can be executed from the perspective of all levels of erasure control entity.

In some embodiments, the erasure orchestration component is further configured to: process the erasure request separately for each of at least two contexts to reach a respective determination of how to handle the erasure request for each context.

In some embodiments, the system is an e-commerce system, and the erasure orchestration component is configured to process the erasure request separately for each of at least two contexts to reach a respective determination of how to handle the erasure request for each context by: processing the request for a first context where a user having the user ID is interacting with the system as a merchant, and a second context where the user having the user ID is interacting with the system as a customer.

In some embodiments, the orchestration erasure component making at least some details available comprises one or a combination of two or more of: making the details available to be pulled by at least one erasure control entity; publishing the details request in a secure manner for access by at least one erasure control entity; storing the details in association with a link, and making the link available at least one erasure control entity; and making the details available to an erasure control entity that has performed a registration procedure.

In some embodiments, the erasure orchestration component is configured to determine how to handle the request by selecting between a set of options that includes at least two of: allowing the erasure request to proceed in its entirety; complete cancellation of the erasure request; interjecting a hold on the erasure request of a specified time duration after which the request can proceed; interjecting a hold on the erasure request of a specified time duration after which one or more control entities must again be surveyed; or allowing erasure by certain components, but not others.

In some embodiments, the erasure orchestration component is configured to determine how to handle the request by: proceeding with the erasure request in its entirety unless at least one of the erasure control entity has responded within a specified time frame to indicate this should not occur.

In some embodiments, the erasure orchestration component is configured to further process the erasure request by: transmitting a respective task to each component.

In some embodiments, the erasure orchestration component is configured to further process the erasure request by: transmitting an erase user task to each component to erase data associated with the user ID; and transmitting a purge store task to each component to purge a store associated with the user ID.

In some embodiments, the method further comprises the plurality of components.

In some embodiments, the method further comprises the plurality of erasure control entities.

In some embodiments, the erasure orchestration component comprises a processor and memory having instructions stored thereon for execution by the processor.

According to another aspect of the present invention, there is provided a computer readable medium having computer executable instructions stored thereon that when executed by a process cause the processor to perform a method comprising: receiving an erasure request pertaining to a user identifier, to erase data in a system that maintains user data in a plurality of components; making at least some details of the request available to at least one erasure control entity; determining how to handle the request based on one or a combination of: input received from one or more of the least one erasure control entity, and lack of input received from one or more of the at least one erasure control entity; based on this determining, further processing the erasure request.

BRIEF DESCRIPTION OF THE DRAWINGS

Embodiments of the disclosure will now be described with reference to the attached drawings in which:

FIG. 2 is an example of a home page of a merchant, according to one embodiment;

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The subject-matter of the present application may be employed in association with a variety of applications and in a variety of domains. As an example, the subject-matter of the present application may be employed for controlling and coordinating the execution of data erasure requests in e-commerce platforms. As such, while e-commerce is merely an example application domain for the subject-matter of the present application, an example e-commerce platform will now be described with reference to FIGS. 1 and 2.

Figure 1:
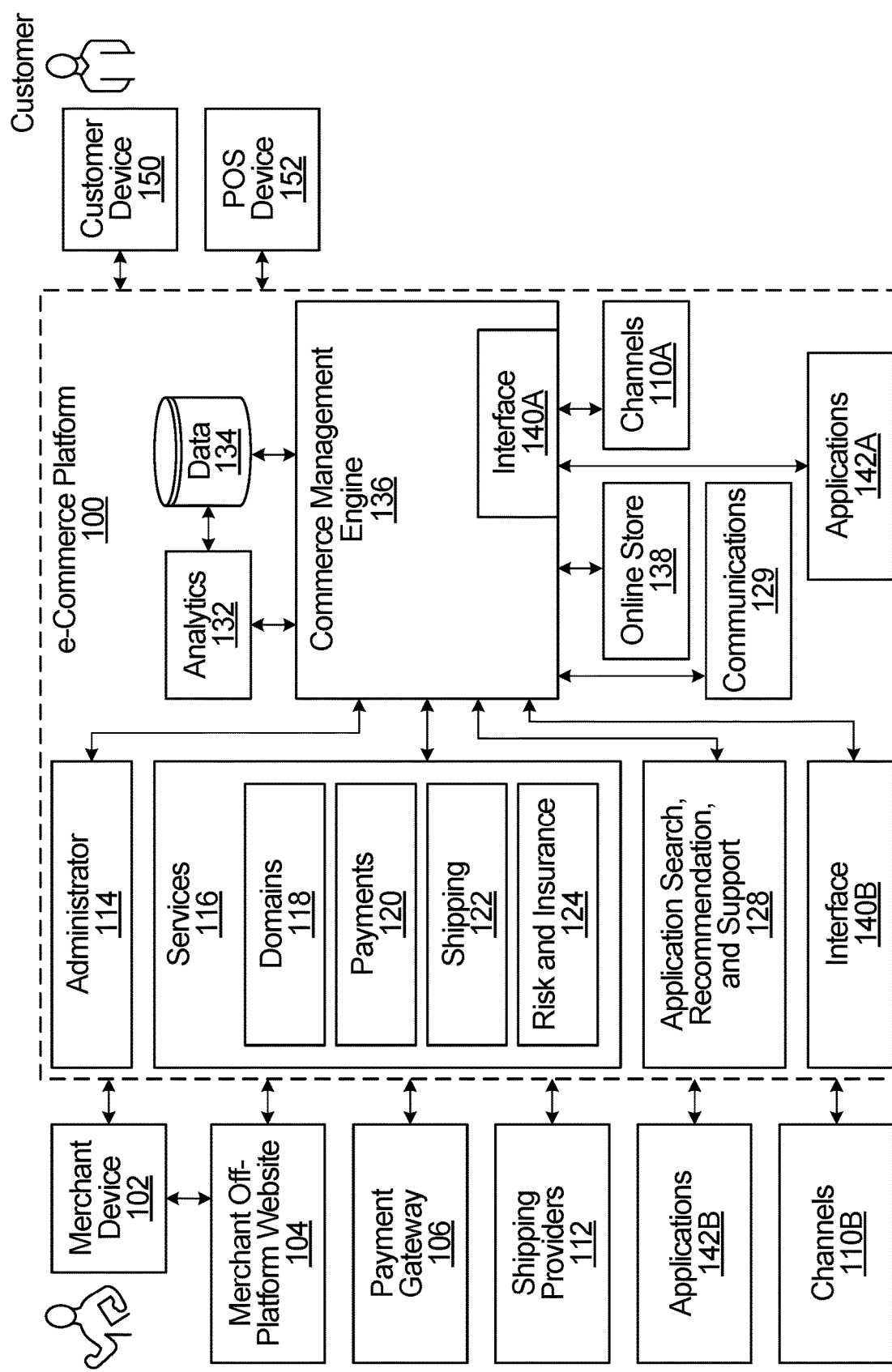
FIG. 1 is a block diagram of an e-commerce platform, according to one embodiment.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS device 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2, which will be described with further reference to FIG. 1, depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1 in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may make a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The e-commerce platform 100 may be providing sales channels for multiple merchants, for their respective customers, and for varying types of merchandise. Payment gateways 106 are provided by the e-commerce platform or by external parties to process transactions in an e-commerce environment.

As mentioned above, the subject-matter of the present application may be employed in relation to an e-commerce platform such as the e-commerce platform 100 of FIG. 1. Put another way, in addition to the above-noted e-commerce capabilities, the e-commerce platform of FIG. 1 can also be configured to facilitate the processing of erasure requests by way of an erasure orchestration component (EOC) in accordance with the subject-matter of the present application. Specifically the EOC described herein may be implemented within the commerce management engine 136 of the depicted e-commerce platform 100. However, it should be understood that the EOC and, more broadly, the subject matter of the present application, is not limited in its application to the e-commerce platform of FIG. 1, or to e-commerce platforms generally. More generally, the EOC and associated methods can find application in a system where user data is stored in/by multiple components.

An organization, such as a provider of an e-commerce platform, such as the e-commerce platform of FIG. 1, may store personal information in many ways across multiple interdependent components, and multiple databases. In many cases, such systems and data bases were designed around the approach of adding data for a user, but less so for the purpose of performing an erasure or responding to an access request. One component may have a constraint on erasure that another does not have, or is not aware of.

A system and method of orchestrating the handling of erasure requests is provided that allows one entity to place a hold, or stop, on a given erasure request. A similar approach can be used for access requests.

Figure 3:
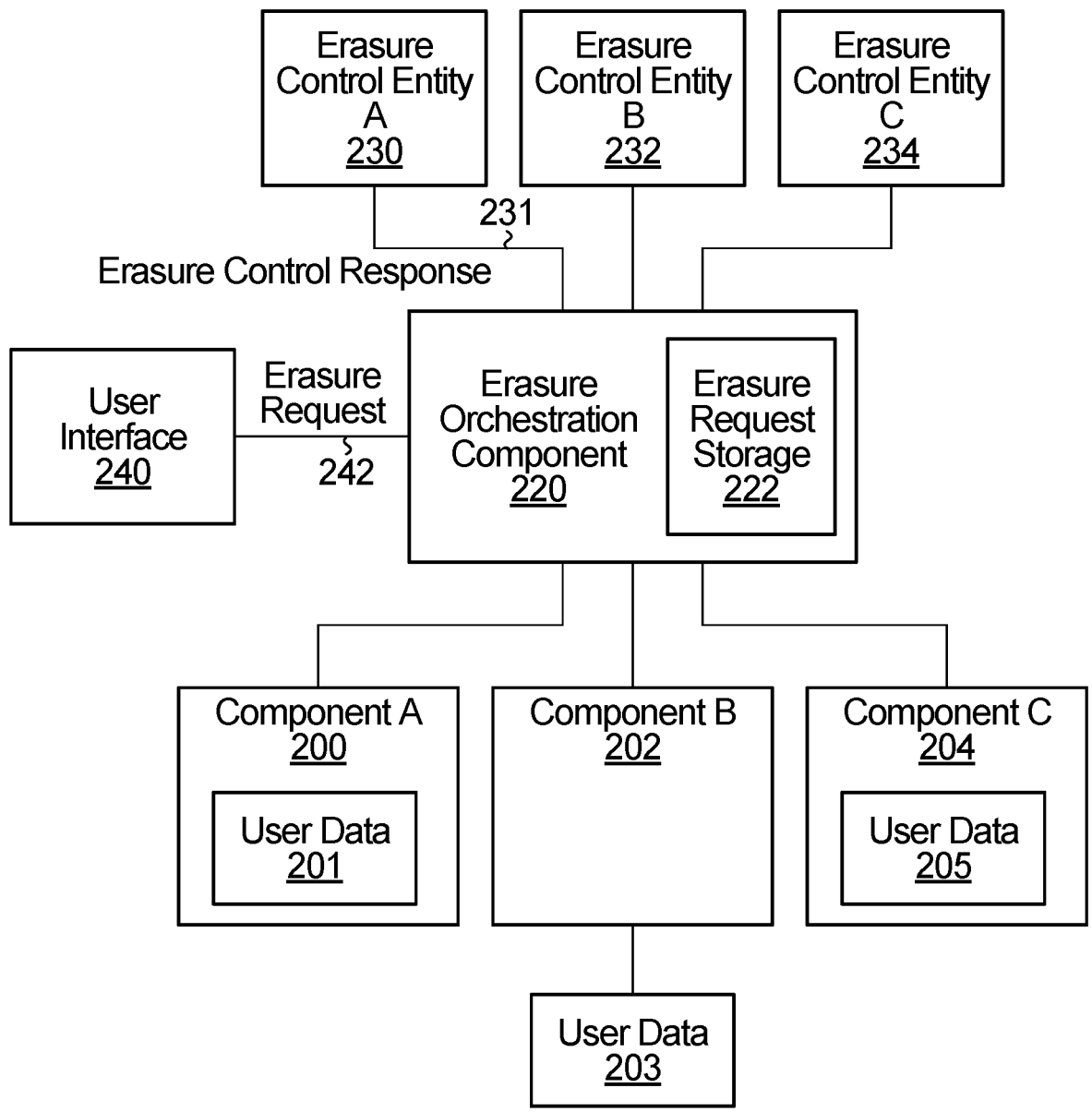
FIG. 3 is a block diagram of a system for processing erasure requests.

A block diagram of a system providing coordinated erasure request handling is shown in FIG. 3. Shown is a system that has three components that maintain user data, component A 200 that maintains user data 201, component B 202 that maintains user data 203, and component C 204 that maintains user data 205. More generally, the number of components in a system may vary depending on system implementation. At the least, there is one component that maintains user data. Large complex systems may maintain data in numerous components. Examples of components are given below. Some components may maintain the data internal to the component, as shown for component A 200, and/or some components may maintain in a separate data store, as shown for component B 202. The components of the system may have varying levels of independence; in some cases certain components being completely independent of each other, and in some cases there being some interdependence between components. The components may include, for example:

data storage components, such as databases;

service components, such as a server, that implement a service; a specific example is a credit card server that implements credit card processing.

The components 200, 202, 204 may be components of an e-commerce platform, such as the e-commerce platform of FIG. 3, or of another system in which multiple components maintain user data. An example of another type of system that may use multiple components to maintain user data is a social media platform.

Also shown is an erasure orchestration component (EOC) 220 which is responsible for overall control of processing and executing erasure requests. The EOC may be implemented on a dedicated platform including processor and memory, or may be executed on a processor within the system that also performs other system functionality. The EOC 220 has erasure request storage 222 for storing erasure requests 222, and associated data pertaining to the processing of such erasure requests. Shown are three erasure control entities, including erasure control entity A 230, erasure control entity B 232, and erasure control entity C 234. More generally, the number of erasure control entities may vary, but there will be at least one.

An erasure control entity is any entity that is granted some control over how the EOC 220 processes erasure requests. Examples of erasure control entities include:

a server within the system; for example, a credit card server;

a department, for example a legal department;

a service.

Each of the erasure control entities 230,232,234 is logically connected to the EOC 220 so as to allow the erasure control entity to convey an erasure control response to the erasure orchestration component 220. Specific examples are provided below.

Shown is a user interface 240 through which a user may initiate an erasure request 242 for processing by the erasure orchestration component 220. While FIG. 3 depicts a direct connection between user interface 240 and erasure orchestration component 220, more generally, some mechanism is provided within the system for a user to initiate an erasure request. Typically, the system will include at least one user interface for users to interact with the system for various purposes, and one or more of these user interface(s) may be configured to receive an erasure request. In another example, a specific email address is defined for receipt of erasure requests, and users can simply email the request to that email address. In another example, one or more of the components 200, 202, 204 may have user interfaces for receiving such a request.

It is noted that the user interface 240 does not need to exist directly on the erasure orchestration component. Instead, it could exist on any related system. For example, there may be another service providing the admin and there may be a trust relationship between that service/component and the erasure orchestration component, and the trust relationship trust may be protected against attackers by way of the use of suitable cryptographic techniques.

In operation, the following functionality is executed in an automated manner. Initially, an erasure request is received by the erasure orchestration component 220. The erasure request pertains to at least one user identifier, and is a request to erase data in the system that maintains user data in/by multiple components 200, 202, 204. The EOC 220 stores details of the erasure request in erasure request storage 222. In some cases, the EOC 220 also stores a time stamp indicating when the request was received. An example of a table containing details of erasure requests is shown in Table 1 below. The table contains a row (more generally an entry) for each erasure request, which is given an erasure request ID for reference purposes. In the illustrated example, each row includes the erasure request ID, the user ID of the erasure request, a timestamp indicating when the erasure request was received, a field for storing the erasure control response from each erasure control entity (discussed in further detail below), and a field for storing the decision made by the EOC on how to handle the erasure request. In the Example of Table 1, two erasure requests have been received, one for User ID A received at time Time_1, and assigned erasure request ID ER_ID_1, and another for User ID A received at time Time_2, and assigned erasure request ID ER_ID_2.

TABLE 1

| Erasure request ID | User ID | Timestamp | Erasure control response from erasure control entity A | Erasure control response from erasure control entity B | Erasure control response from erasure control entity C | Decision on how to handle the request |
|---|---|---|---|---|---|---|
| ER_ID_1 | User ID A | Time_1 | | | | |
| ER_ID_2 | User ID B | Time_2 | | | | |

In some embodiments, the timestamp reflects a specific time the business is thought to have received the request, (as opposed to the time the erasure control entity received the request). These two times may be different, for example where these requests are initially received by one service and passed on to the orchestrator, as there can potentially be a significant delay.

Rather than a single field shown as "Decision on how to handle the request", the outcome may have multiple steps, which are detailed in a particular action or set of actions, for example a set of steps, a process/method, a particular script/workflow, etc.

Next, the EOC makes details of the erasure request available to at least one of the erasure control entities 230, 232, 234. At least one mechanism of making the erasure request available may be implemented.

In some embodiments, erasure requests are made available by pushing this information to one or more erasure control entities, for example by automated email, text, web page or other channel such as an application programming interface (API), event subscription service or web hook to name a few additional examples.

In some embodiments, erasure requests are made available by making the request available to be pulled by an erasure control entity, optionally following a push notification to trigger the pull.

In some embodiments, erasure requests are made available by publishing the request in a secure manner for access by an erasure control entity.

In some embodiments, erasure requests are made available by storing the information in association with a link, and making the link available to the erasure control entity.

In some embodiments, erasure requests are made available by using a registration system, whereby an erasure control entity registers to be informed of erasure requests pertaining to specific user IDs, and for a given erasure request, the EOC informs only those erasure control entities that have registered to be informed. This can be viewed as a special case of publishing.

More generally, any of the other described examples can be used to make the request available to those erasure control entities that have registered to be informed.

Each of the erasure control entities can respond with an erasure control response to indicate whether there is any objection, from the perspective of the specific erasure control entity, with acting upon the erasure request. Examples of erasure control responses include:

Response indicating complete denial—no user data to be erased;
Response indicating a time period after which user data can be erased in the absence of further response;
Response indicating the user data can be erased as per the request;
Lack of a response within a time frame is equated with an indication that the erasure request cannot be executed. For a control entity that "responds" in this manner, the control entity must respond positively within the time frame in order for the erasure request to be executed; with this approach, the default will be that the erasure request cannot be executed after the time frame. This ensures that the control entities consider the request;
Lack of a response within a time frame is equated with an indication that the erasure request can be executed. For a control entity that "responds" in this manner, the control entity must respond positively within the time frame in order to block the erasure request from being executed. with this approach, the default will be that the erasure request can be executed after the time frame. This approach is less onerous on the control entities;
The rights that an erasure control entity has to affect the response to the erasure request may vary by entity. Different possible rights include:
Complete cancellation of the erasure request;
Interject a hold on the erasure request of a specified time duration after which the request can proceed;
Interject a hold on the erasure request of a specified time duration after which one or more control entities must again be surveyed;
Allow erasure by certain components, but not others.

The EOC 220 collects the responses from the erasure control entities. Table 2 contains a set of example responses, in which a response of "Y" means it is acceptable to execute the erasure request, and a response of "N" means it is not acceptable to execute the erasure request. Of course, if other responses are possible as described above, then the content of the table would vary accordingly. In the illustrated example, all of the erasure control entities have responded with "Y" for erasure request having ER_ID_1. Two of the erasure control entities have responded with "Y" for erasure request having ER_ID_2, and one has responded with "N".

TABLE 2

| Erasure request ID | User ID | Timestamp | Erasure control response from erasure control entity A | Erasure control response from erasure control entity B | Erasure control response from erasure control entity C | Decision on how to handle the request |
|---|---|---|---|---|---|---|
| ER_ID_1 | User ID A | Time_1 | Y | Y | Y | |
| ER_ID_2 | User ID B | Time_2 | Y | N | Y | |

The EOC automatically processes the input received from the erasure control entities. The EOC determines whether to proceed with none, some or all of the erasure requests based on input or lack of input from the erasure control entities. An example is shown in Table 3, where the EOC decides to proceed with the erasure request having ER_ID_1, and the EOC decides not to proceed with the erasure request having ER_ID_2.

TABLE 3

| Erasure request ID | User ID | Timestamp | Erasure control response from erasure control entity A | Erasure control response from erasure control entity B | Erasure control response from erasure control entity C | Decision on how to handle the request |
|---|---|---|---|---|---|---|
| ER_ID_1 | User ID A | Time_1 | Y | Y | Y | Y |
| ER_ID_2 | User ID B | Time_2 | Y | N | Y | N |

Based on this determination, the EOC proceeds with none, some or all of the erasure request. This involves sending an instruction to each component to perform the erasure. Depending on the erasure control responses, the EOC may also not act on the request immediately, but rather queue the request for future handling. The EOC may track whether the erasure has been completed for each component, for example, in a table such as Table 4 below. The example of Table 4 shows the erasure status for each of components A,B and C, and shows an overall erasure completion status as well.

TABLE 4

| Erasure request ID | User ID | Timestamp | Erasure status - Component A | Erasure status - Component B | Erasure status - Component C | Erasure completion status |
|---|---|---|---|---|---|---|
| 1 | User ID A | Time_1 | Complete | Complete | Complete | Complete |

In some embodiments, sending an instruction to each component involves sending one or more tasks to each of the components, such as an "erase user" task or a "purge store" task. The "erase user" task pertains to the erasing of data specific to the user ID. The "purge store" task pertains to erasing all data pertaining to a store owned by the user having the user ID. These examples are specific to the e-commerce system example. More generally, the nature of the tasks may vary for different types of system. Each of the components executes the tasks and reports back to the EOC. An example is shown in Table 5 below, where processing an erasure request involves two tasks, Task 1, and Task 2, which are sent to each of the components. Erasure completion status is tracked for each task.

In some embodiments, the system may allow a user having a user ID to interact with the system using multiple contexts. In this case, the user may have the right to request erasure from the system in respect of the user's interactions with the system using a specific context or context of the multiple contexts, but the same user may not have the right to request erasure from the system in respect of the user's interactions with the system using an other specific context or contexts.

For example, a user may interact with the e-commerce platform as a merchant user in respect of the merchant user's online store(s), and at the same time as a customer of other merchant's online stores. In this case, the user may have the right to request erasure from the system in the context being

TABLE 5

| Erasure request ID | User ID | Timestamp | Tasks | Erasure status - Component A | Erasure status - Component B | Erasure status - Component C | Erasure completion status |
|---|---|---|---|---|---|---|---|
| 1 | User ID A | Time_1 | Task 1 | Complete | Complete | Complete | Complete |
|  |  |  | Task 2 | Complete | Incomplete | Complete | Complete |

In some embodiments, there may be multiple levels of erasure control entities that are informed of the erasure request in sequence. The erasure control entities having the first level are informed first. Once no objection is raised by those erasure control entities, the erasure control entities having the next level are informed, and so on. The next level and lower levels do not even learn of the request until it passes the higher levels. The EOC coordinates this. The different levels may have different rights in terms of their ability to affect the erasure.

An example of different levels of erasure having different associated rights is shown in Table 6 below, where erasure control entity A has priority 1, erasure control entity B has priority 1, and erasure control entity C has priority 2. Details of an erasure request are not made available to the priority 2 erasure control entity until the priority 1 erasure control entities allow (or do not object to) the erasure. In the illustrated example, for the first erasure request, the priority 1 erasure control entities have responded with a "Y", and the priority 2 erasure control entity has been made aware of the erasure request, and has responded with a "Y" and the overall decision to proceed is "Y". For the second erasure request, the priority 1 erasure control entities have responded with a "Y" and a "N", and the priority 2 erasure control entity is not made aware of the erasure request, and the overall decision to proceed is "N".

a merchant user, but the same user may not have the right to request erasure from the system of its data with respect to its interaction as a customer with the one or more other online stores, as in effect, that data is owned by these other online stores. The user would need to communicate with the other online stores directly to request erasure with those stores.

There may be different entities responsible for controlling data, as opposed to processing certain data. For example, an E-commerce platform may as a processor for a merchant's data, with the merchant acting as a controller, and so the E-commerce platform should not the data without the merchant's permission/request.

In another example of different context, there may be a buyer using a shop app and a merchant owning the shop app. Both could ask the e-commerce platform directly for an erasure, but the set of systems this would impact would be different.

In some embodiments, where there are multiple contexts, in effect the request is treated as a corresponding set of multiple erasure requests, with erasure control components providing respective input for each context, and an overall decision made for each context. An example is shown in Table 7 below, which shows a respective set of erasure control responses, and a respective overall decision, for each of two contexts, Context A and Context B.

TABLE 6

| Erasure request ID | User ID | Timestamp | Priority 1 Erasure control response from erasure control entity A | Priority 1 Erasure control response from erasure control entity B | Priority 2 Erasure control response from erasure control entity C | Decision on how to handle the request |
|---|---|---|---|---|---|---|
| 1 | User ID A | Time_1 | Y | Y | Y | Y |
| 2 | User ID B | Time_2 | Y | N | N/A | N |

TABLE 7

| Erasure request ID | User ID | Timestamp | Context | Erasure control response from erasure control entity A | Erasure control response from erasure control entity A | Erasure control response from erasure control entity A | Decision on how to handle the request |
|---|---|---|---|---|---|---|---|
| 1 | User ID A | Time_1 | Context A | Y | Y | Y | Y |
|  |  |  | Context B | Y | N | N | N |

Figure 6A:
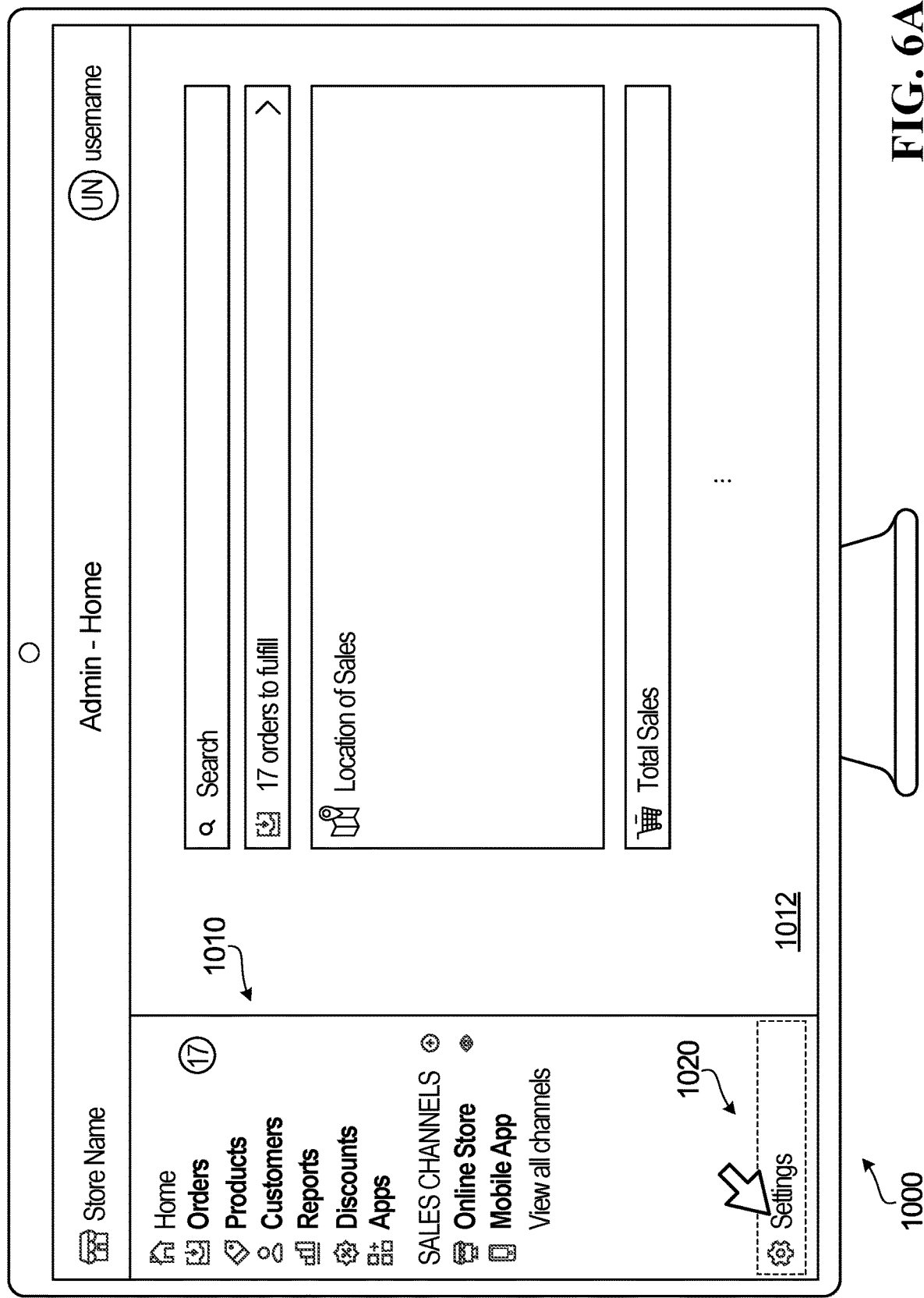
FIGS. 6A to 6G are examples of user interfaces for use in processing erasure requests.
Figure 6B:
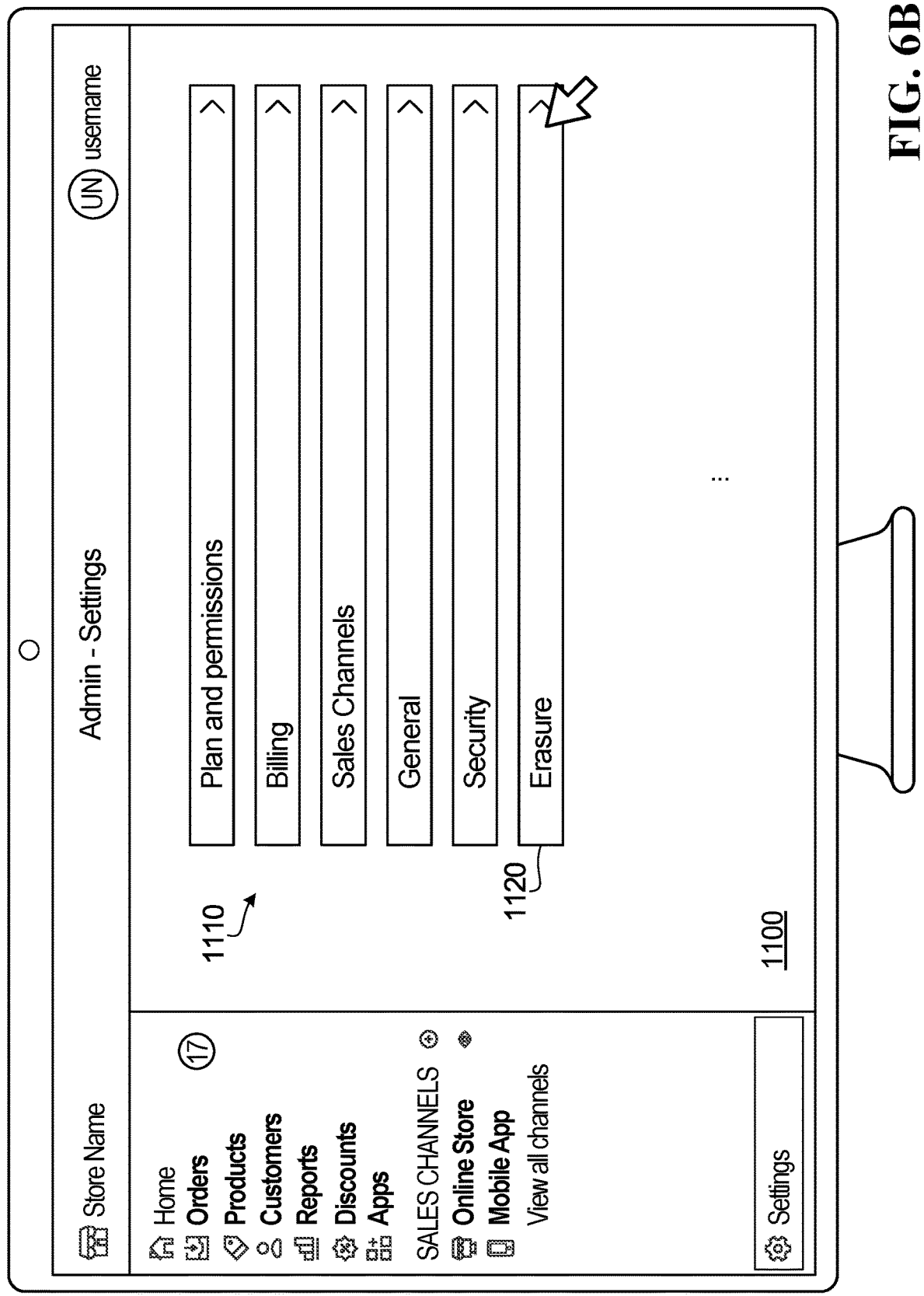
Figure 6C:
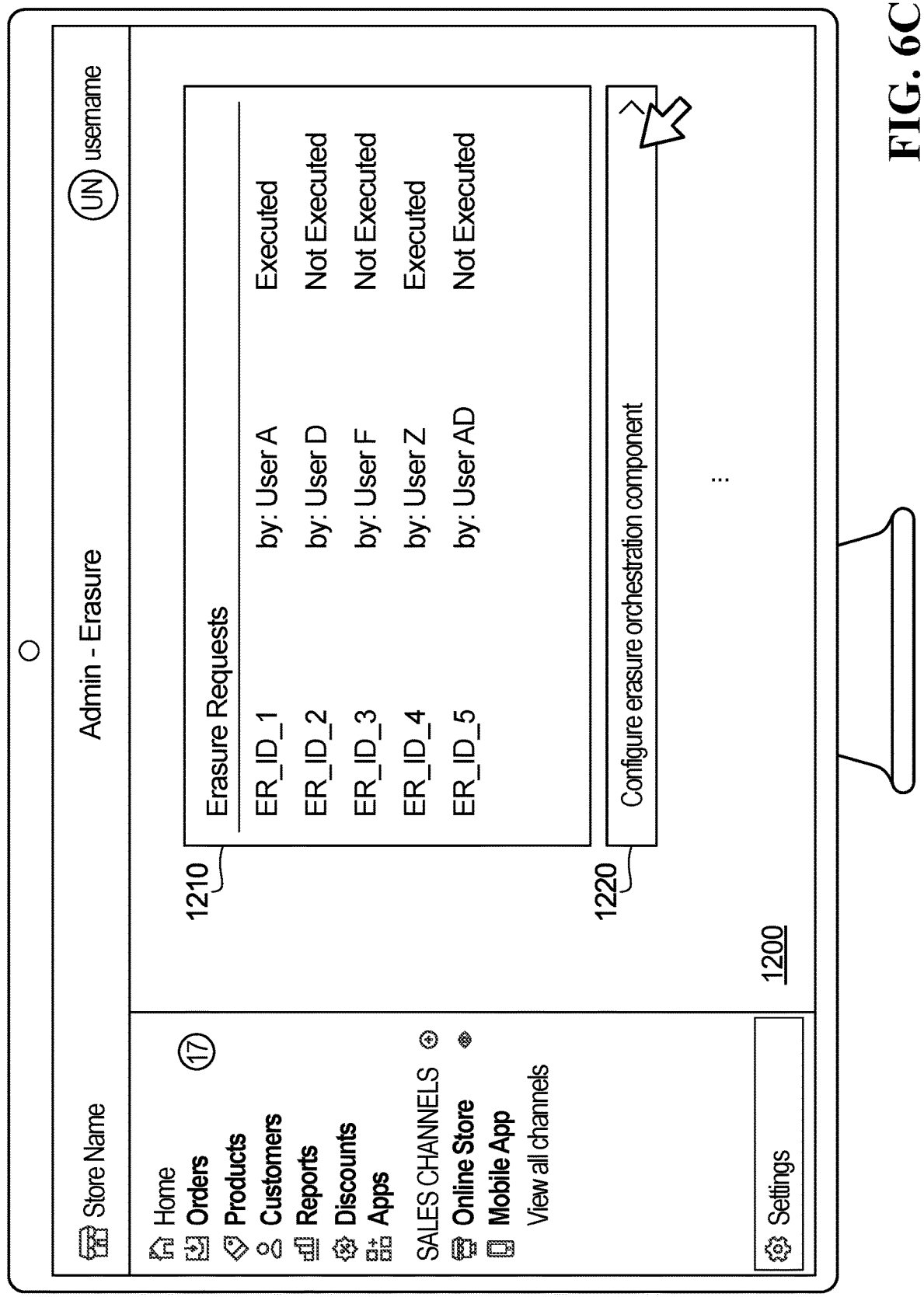

User Interface Examples:

An example of a user interface allowing a user, typically an employee of the organization providing the e-commerce platform, to access the erasure configuration settings is depicted in FIG. 6A, FIG. 6B and FIG. 6C. Referring first to FIG. 6A, the example illustrates a computer window 1000 where from the home page 1012 the user can access from the sidebar menu 1010 various pages within the e-commerce platform such as "Orders", "Products", "Settings" and the like. In the example selecting the settings button 1020 in the side bar menu 1010 directs the user to the settings page 1100 shown in FIG. 6B.

In the illustrated example of the settings page 1100 the user will be provided subsections 1110 of the settings page, such as "Plan and permissions", "Billing", "Sales channels" and "Erasure". In selecting "Erasure" 1120 of the settings subsections 1110 the user is directed to erasure status page 1200 shown in FIG. 6C.

The illustrated example of the erasure status page 1200, there is a list of erasure requests 1210 that have been received and a Configure erasure orchestration component button 1220. In the illustrated example, the received. Each erasure request in the list has an identification number ("ER_ID_1" to "ER_ID_5"), a user ID of the user who requested the erasure (e.g. "User A", "User D") and a status of the erasure "Executed" or "Not Executed". The erasure orchestration component directs the user to the erasure control entity configuration page 1300 shown in FIG. 6D.

In some embodiments, user IDs are generated by the E-commerce platform, and supplying such a user ID can be used to provide a common reference point after all other personal information is dropped/removed, in case the individual should follow up. If a user ID that is difficult to guess is provided, then a record of erasure requests, in association with the user ID can be maintained, and the user ID can be used as a basis for requesting status/progress of the erasure request.

Figure 6D:
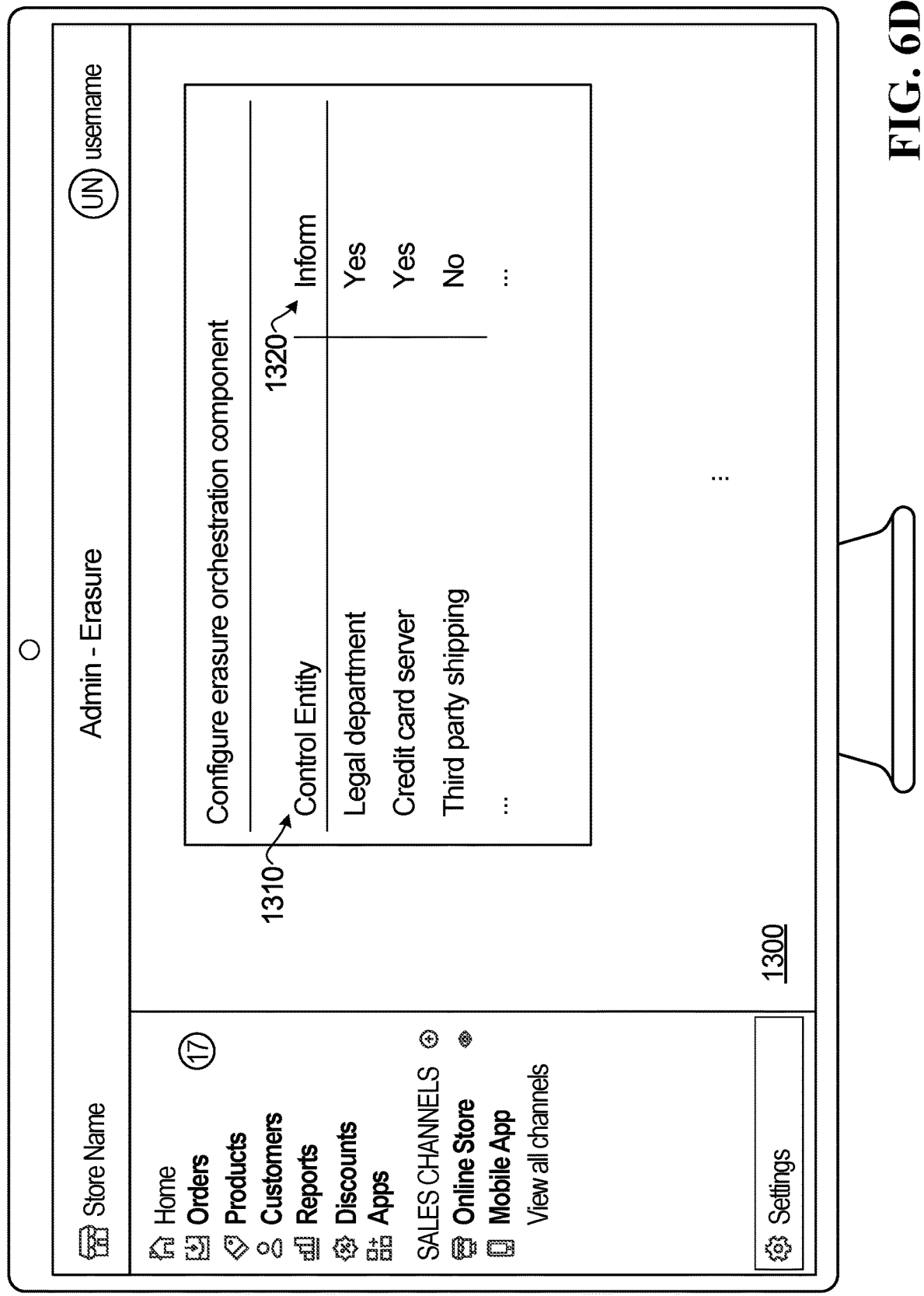

In some embodiments, a user interface 240 is provided to configure which erasure control entities are to be informed of an erasure request. An example user interface that may be implemented to interact with the user for this purpose is depicted in FIG. 6D. The example illustrates an erasure control entity configuration page 1300 where three control entities "Credit card server", "Legal department" and "Third party shipping" are listed in control entity column 1310. Each control entity has an associated "Yes" or "No" in the inform column 1320 indicating whether that erasure control entity is to be informed of an erasure request 242 or not. In the illustrated example there are two control entities "Credit card server" and "Legal department" with inform of erasure request set to "Yes" and there is one control entity "Third party shipping" with inform of erasure request set to "No". Selecting "Yes" or "No" in the inform column 1320, by way of example, will change which set of control entities would receive details of the erasure request.

Figure 6E:
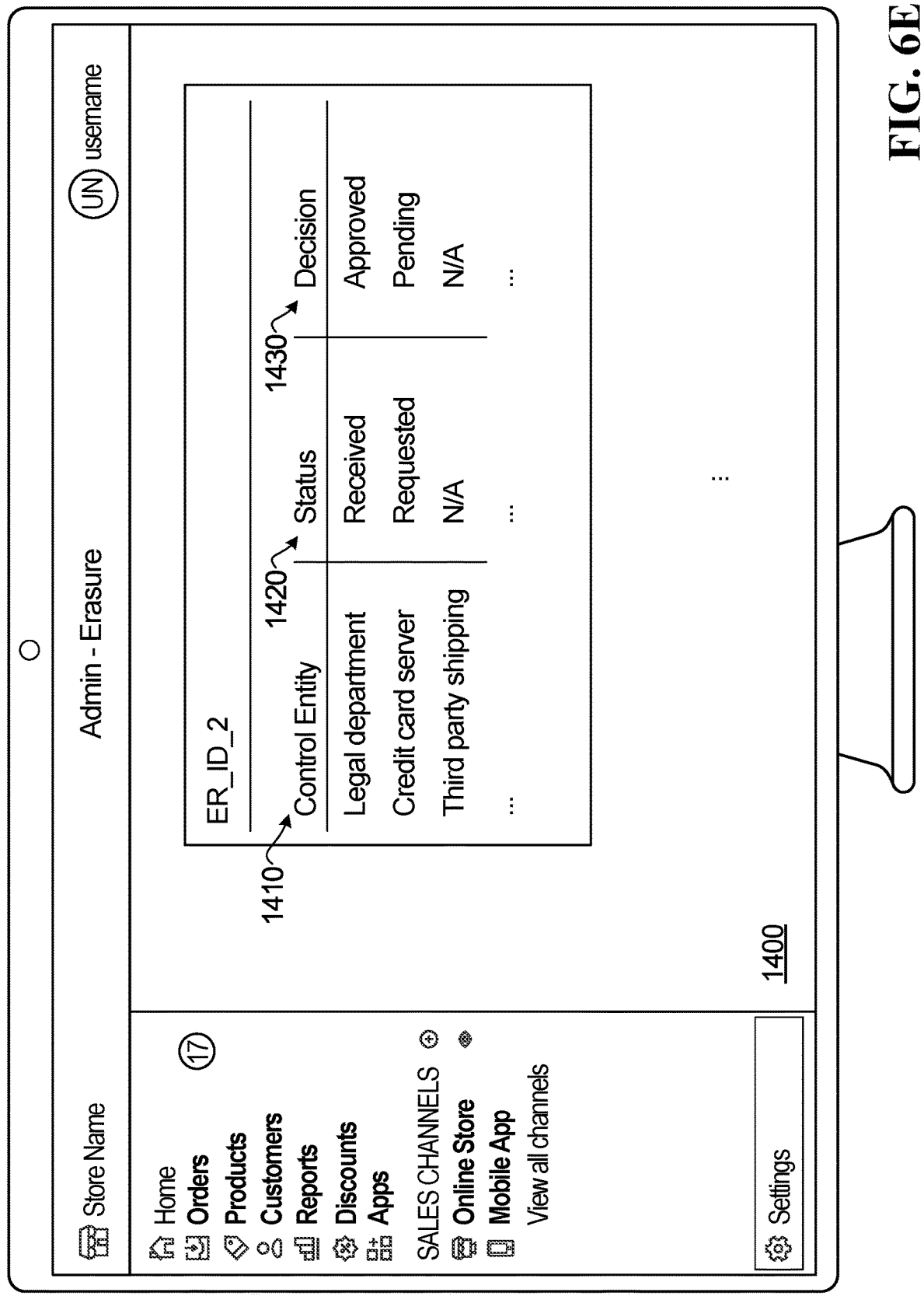

In some embodiments, a user interface is provided to allow access to more detailed erasure request status information, for example indicating which requests have been received, what responses have been received if any from erasure control entities. An example user interface that may be implemented to interact with the user for this purpose will be described with further reference to FIG. 6C, and with reference to FIG. 6E. The erasure settings page 1200 shown in FIG. 6C contains a list of the erasure requests 1210 that have been received. The user can select any one of the erasures requests 1210 listed. For example, if the user selects erasure request "ER_ID_2" they will be directed to erasure request "ER_ID_2" status page 1400 depicted in FIG. 6E. On status page 1400 the control entities are listed in column 1410, and in the illustrated example include the legal department, credit card server, and third party shipping. In FIG. 6E, the status of the erasure request for each erasure control entity is shown in column 1420 and may include for example, "Received", "Requested" or "N/A" (not applicable). The not applicable status may be used where the particular erasure control entity is not configured to receive the request. The decision of the erasure control entity is shown in column 1430 and may include for example "Approved", "Refused", "Pending" or "N/A".

In some embodiments, where the request is not approved, the rationale for the current status (such as refused/pending) is made available in the user interface. For example, this could indicate that there is a loan with an outstanding balance.

In the illustrated example the erasure control entity "Legal department" has "approved" the erasure request and it has been "received" by the EOC. The erasure request decision has been "requested" from the erasure control entity "Credit card server" and its decision is "Pending". The erasure control entity "Third party shipping" has status and decision "N/A" as its configuration in inform column 1320 (FIG. 6D) in the example described above was set to "No" and therefore the erasure request was not shared with the "Third party shipping" erasure control entity. Once the EOC receives the decision of all the erasure control entities, it will be able to determine how to handle the erasure request.

Figure 6F:
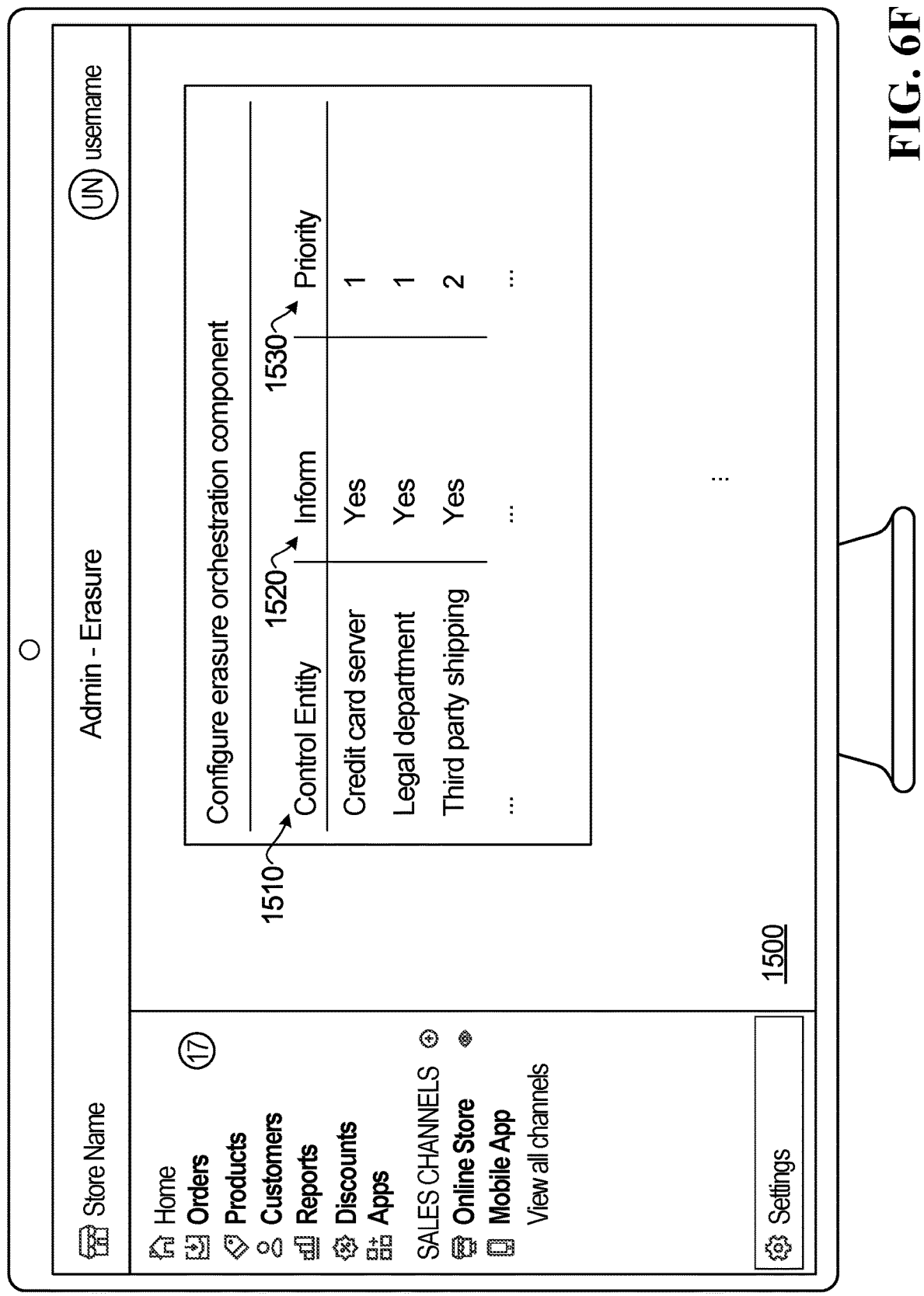

Recall that in some embodiments, an erasure request is made available to erasure control entities in an order defined by levels of the erasure control entities. In some embodiments, a user interface is provided to allow a user to configure the level of the erasure control entities. An example user interface that may be implemented to interact with the user for this purpose is depicted in FIG. 6F. The example illustrates an erasure control entity configuration page 1500 where three control entities "Credit card server", "Legal department" and "Third party shipping" are listed in control entity column 1510. The control entities have an associated "Yes" or "No" in the inform column 1520 as well as a priority level "1" or "2" in the priority column 1530. In the illustrated example all three control entities "Credit card server", "Legal department" and "Third party shipping" have the inform of erasure request set to "Yes". Erasure control entities "credit card server" and "legal department" have priority level "1", and the third control entity "Third party shipping" has priority level "2". In this illustrated example details of the erasure request are first made available to "Legal department" and "Credit card server" as they have priority level "1". Based on "Legal department" and "Credit card server" decisions, it is then determined if the erasure request can be executed from the perspective of the priority level "1" erasure control entities. Based on this determination, if the answer is yes, the erasure request details are then provided to "Third party shipping" as it has priority level "2". An overall decision on whether to execute the erasure request can be made once a suitable response/lack of response for "Third party shipping" erasure control entity is received. On the other hand, if the determination based on the decisions from the priority level "1" control entities is that the erasure request should not be executed, then the erasure request details are not provided to "Third party shipping" as it has priority level "2".

Referring again to FIG. 6E, in embodiments where the priority level of the erasure control entities can be configured, the detailed erasure status may for example provide greater status information in column 1420. For example, the status may read, for priority level "2" erasure control entities, "Waiting for priority level 1 approval" and "Priority level 1 could not execute request".

While not shown in the illustrated examples, in some embodiments, the system does provide a response back to a requesting service/user of the result of their request for erasure. For example, this could indicate that the request is in process, has been completed, or has been denied. In some embodiments, when a request is denied, this is not communicated to the requesting service/user.

The examples of FIGS. 6A to 6G show a window that appears to be within the store admin. This is just an example, more generally, there may be a user interface that is available to an administrator. Typically this would not be visible to the requestor, or even all administrators but instead just to a specific administrator.

Figure 4:
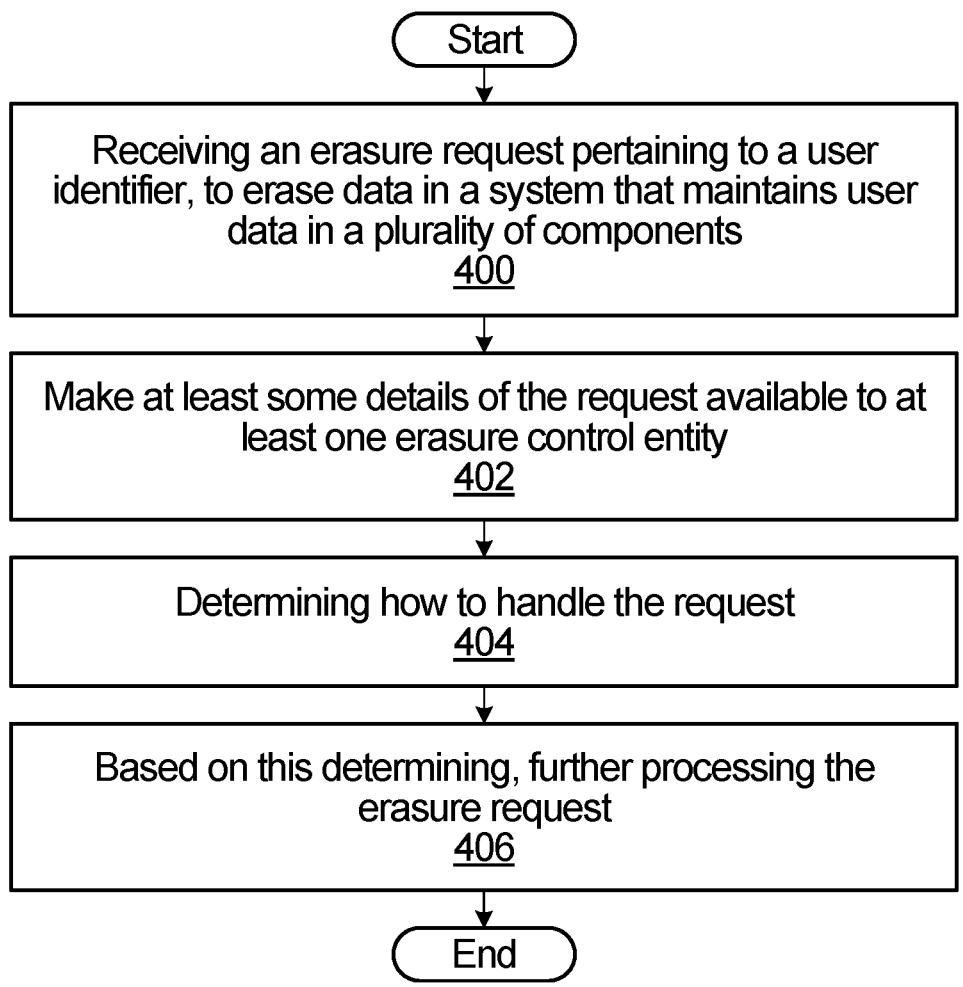
FIGS. 4 and 5 are flowcharts of methods for processing erasure requests.
Figure 6G:
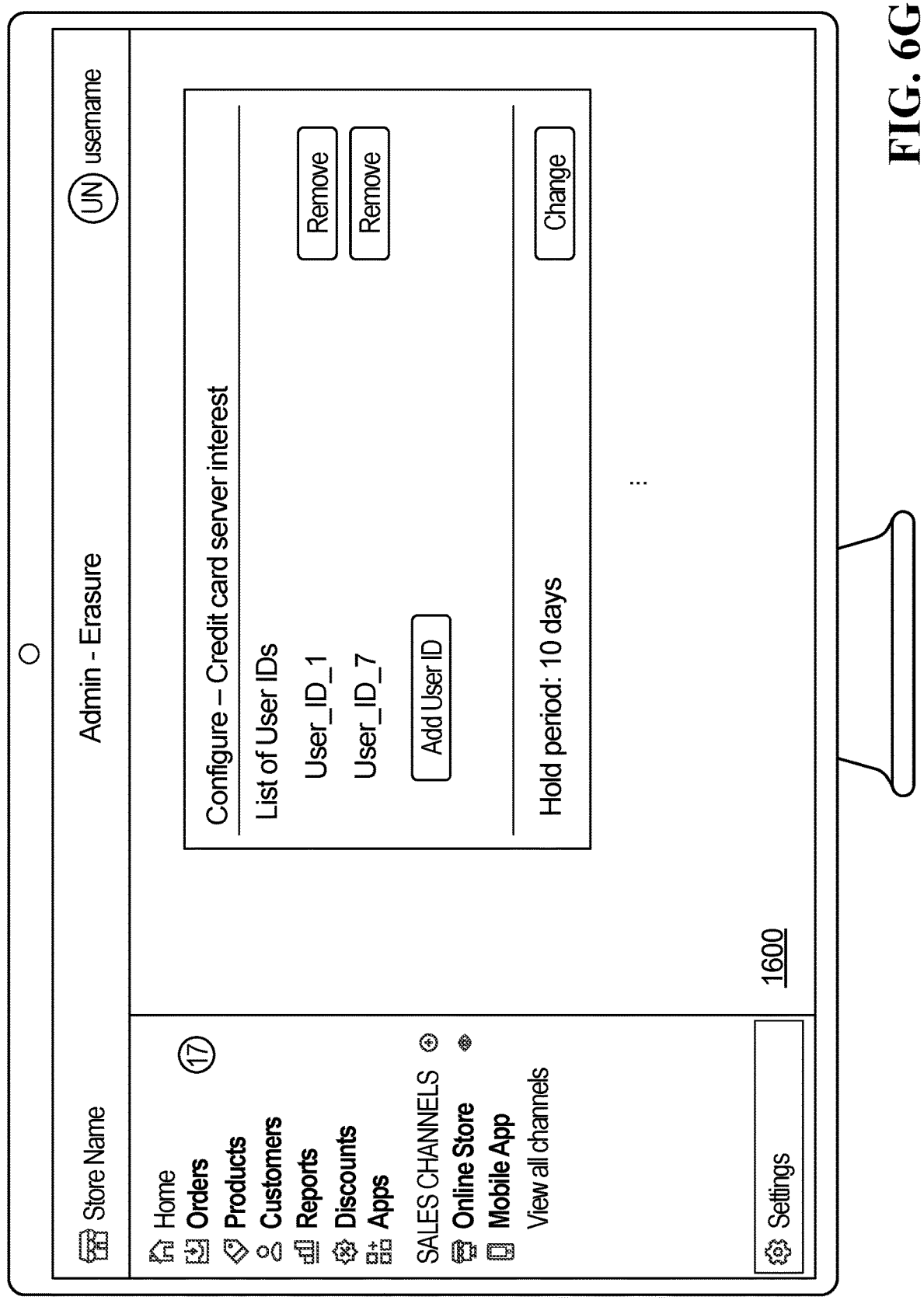

In some embodiments, a user interface is provided for an erasure control entity to configure its own interest in erasure requests, and to configure how a given erasure request is to be processed. This may allow a user to enter a user ID or user IDs that the erasure control entity is interested in. This may also allow the user to configure a hold period for executing an erasure request in respect of any user ID the erasure control entity is interested. This would be useful in a situation where the erasure control entity is not immediately sure whether the erasure request should be performed, but expects that it should be acceptable after the hold period. In some embodiments, where a hold period is established, during the hold period, the erasure control entity may still retract its hold-based approval. Alternatively, this hold period can be set on a per user ID basis. An example user interface that may be implemented to interact with an erasure control entity for this purpose is depicted in FIG. 6G. The example illustrates an erasure control entity interest page 1600. The erasure control entity interest page 1600 shows a list of user IDs that have been already entered, and an "add user ID" button to add to the list. A user ID can be removed from the list by clicking on the appropriate "Remove" button next to that user ID. In the illustrated example, there is a single hold period that can be configured, and it is set to 10 days in the illustrated example. A user can change this via the depicted user interface. Referring now to FIG. 4, shown is a flowchart of a method for processing erasure requests provided by an embodiment of the disclosure. The method begins in block 400 with receiving an erasure request pertaining to a user identifier, to erase data in a system that maintains user data in a plurality of components. The method continues in block 402 with making at least some details of the request available to at least one erasure control entity. The method continues in block 404 with determining how to handle the request based on one or a combination of input received from one or more of the least one erasure control entity; and lack of input received from one or more of the at least one erasure control entity. The method continues in block 406 with, based on this determining, further processing the erasure request. This can involve for example, executing the erasure request, denying the request, or deferring the request for some period of time, or until some further constraint is satisfied.

Figure 5:
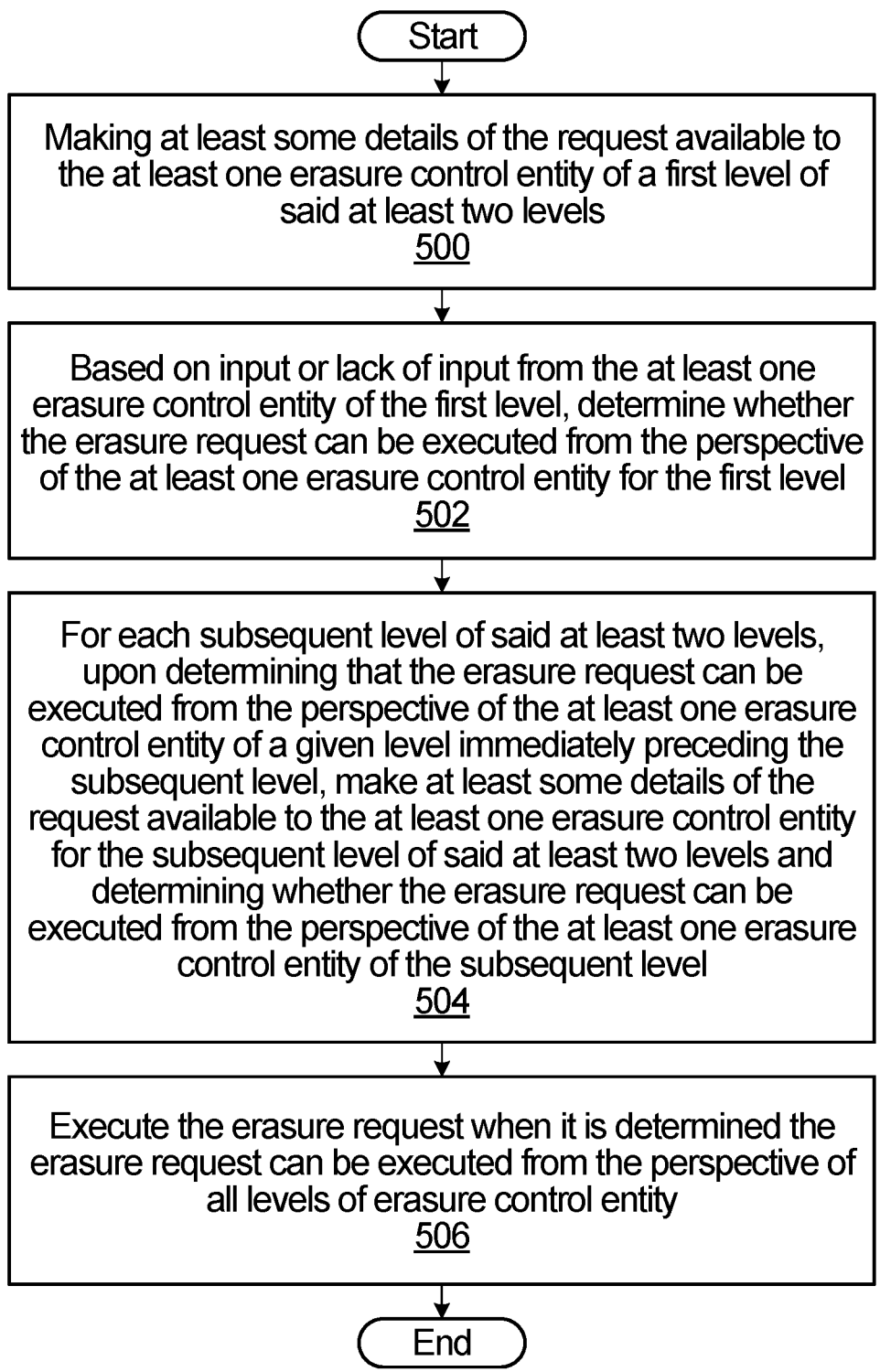

As detailed above, in some embodiments, the erasure control entities including at least one erasure control entity of each of two levels. FIG. 5 is a flowchart of a method of making at least some details of the request available to at least one erasure control entity. The method begins in block 500 with first making at least some details of the request available to the at least one erasure control entity of a first level of said at least two levels. The method continues in block 502 with, based on input or lack of input from the at least one erasure control entity of the first level, determining whether the erasure request can be executed from the perspective of the at least one erasure control entity for the first level. The method continues in block 504 with, for each subsequent level of said at least two levels, upon determining that the erasure request can be executed from the perspective of the at least one erasure control entity of a given level immediately preceding the subsequent level, making at least some details of the request available to the at least one erasure control entity for the subsequent level of said at least two levels and determining whether the erasure request can be executed from the perspective of the at least one erasure control entity of the subsequent level. The method continues in block 506 with executing the erasure request when it is determined the erasure request can be executed from the perspective of all levels of erasure control entity.

While the embodiment of FIG. 5 refers to levels, and assumes that consideration of input from the levels sequentially, more generally, the dependencies may be defined with a directed acyclic dependency graph. In addition, multiple checks for holds may occur simultaneously, rather sequentially as is described above.

For the methods described herein, in some embodiments, the input from the erasure control entities be based on a polling mechanism, in which the erasure control entities respond to a request of some sort to provide the input. In some embodiments, the input from the erasure control entities is based on a push mechanism, in which the erasure control entities provide their input without a specific request.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
receiving an erasure request pertaining to a user identifier, to erase data in a system that maintains user data in a plurality of components;
making at least some details of the request available to at least one erasure control entity;
determining how to handle the request based on one or more responses received within a specified time frame from the at least one erasure control entity and a timestamp associated with the responses indicating when the request was received, wherein the specified time frame is measured relative to the timestamp and each of the responses is one of:
input received from the at least one erasure control entity; and
lack of input received from the at least one erasure control entity;
based on this determining, further processing the erasure request.

2. The method of claim 1 wherein the at least one erasure control entity comprises a plurality of erasure control entities, the plurality of erasure control entities including at least one erasure control entity of each of two levels, wherein making at least some details of the request available to at least one erasure control entity comprises:
first making at least some details of the request available to the at least one erasure control entity of a first level of said at least two levels;
based on input or lack of input from the at least one erasure control entity of the first level, determining whether the erasure request can be executed from the perspective of the at least one erasure control entity for the first level;
for each subsequent level of said at least two levels, upon determining that the erasure request can be executed from the perspective of the at least one erasure control entity of a given level immediately preceding the subsequent level, making at least some details of the request available to the at least one erasure control entity for the subsequent level of said at least two levels and determining whether the erasure request can be executed from the perspective of the at least one erasure control entity of the subsequent level; and
executing the erasure request when it is determined the erasure request can be executed from the perspective of all levels of erasure control entity.

3. The method of claim 1 further comprising:
processing the erasure request separately for each of at least two contexts to reach a respective determination of how to handle the erasure request for each context.

4. The method of claim 3 wherein the system is an e-commerce system, and processing the erasure request separately for each of at least two contexts to reach a respective determination of how to handle the erasure request for each context comprises processing the request for a first context where a user having the user identifier is interacting with the system as a merchant, and a second context where the user having the user identifier is interacting with the system as a customer.

5. The method of claim 1 wherein making at least some details available comprises one or a combination of two or more of:
making the details available to be pulled by at least one erasure control entity;
publishing the details request in a secure manner for access by at least one erasure control entity;
storing the details in association with a link, and making the link available at least one erasure control entity; and
making the details available to an erasure control entity that has performed a registration procedure.

6. The method of claim 1 wherein:
determining how to handle the request comprises selecting between a set of options that includes at least two of:
allowing the erasure request to proceed in its entirety;
complete cancellation of the erasure request;
interjecting a hold on the erasure request of a specified time duration after which the request can proceed;
interjecting a hold on the erasure request of a specified time duration after which one or more control entities must again be surveyed; or allowing erasure by certain components, but not others.

7. The method of claim 1 wherein determining how to handle the request comprises:
proceeding with the erasure request in its entirety unless at least one of the erasure control entity has responded within the specified time frame to indicate this should not occur.

8. The method of claim 1 wherein further processing the erasure request comprises:
transmitting a respective task to each component.

9. The method of claim 1 wherein further processing the erasure request comprises:
transmitting an erase user task to each component to erase data associated with the user ID; and
transmitting a purge store task to each component to purge a store associated with the user ID.

10. A computer system that maintains data in a plurality of components, the computer system comprising: at least one processor and a memory storing instructions that, when executed by the at least one processor, cause the computer system to:
receive an erasure request pertaining to a user identifier, to erase data in the computer system;
make at least some details of the request available to at least one of a plurality of erasure control entities;
determine how to handle the request based on one or more responses received within a specified time frame from the at least one erasure control entity and a timestamp associated with the responses indicating when the request was received, wherein the specified time frame is measured relative to the timestamp and each of the responses is one of:
input received from the at least one erasure control entity; and
lack of input received from the at least one erasure control entity;
based on this determining, further process the erasure request.

11. The computer system of claim 10, wherein the at least one erasure control entity comprises a plurality of erasure control entities, the plurality of erasure control entities including at least one erasure control entity of each of two levels, wherein the computer system makes at least some details of the request available to at least one erasure control entity by:
first making at least some details of the request available to the at least one erasure control entity of a first level of said at least two levels;
based on input or lack of input from the at least one erasure control entity of the first level, determining whether the erasure request can be executed from the perspective of the at least one erasure control entity for the first level;

for each subsequent level of said at least two levels, upon determining that the erasure request can be executed from the perspective of the at least one erasure control entity of a given level immediately preceding the subsequent level, making at least some details of the request available to the at least one erasure control entity for the subsequent level of said at least two levels and determining whether the erasure request can be executed from the perspective of the at least one erasure control entity of the subsequent level; and executing the erasure request when it is determined the erasure request can be executed from the perspective of all levels of erasure control entity.

12. The computer system of claim 10, further configured to:

process the erasure request separately for each of at least two contexts to reach a respective determination of how to handle the erasure request for each context.

13. The computer system of claim 12, wherein the computer system is an e-commerce system and the computer system is configured to process the erasure request separately for each of at least two contexts to reach a respective determination of how to handle the erasure request for each context by:

processing the request for a first context where a user having the user identifier is interacting with the computer system as a merchant, and a second context where the user having the user identifier is interacting with the computer system as a customer.

14. The computer system of claim 10, wherein making at least some details available comprises one or a combination of two or more of:

making the details available to be pulled by at least one erasure control entity;

publishing the details request in a secure manner for access by at least one erasure control entity;

storing the details in association with a link, and making the link available at least one erasure control entity; and making the details available to an erasure control entity that has performed a registration procedure.

15. The computer system of claim 10, further configured to determine how to handle the request by selecting between a set of options that includes at least two of:

allowing the erasure request to proceed in its entirety;

complete cancellation of the erasure request;

interjecting a hold on the erasure request of a specified time duration after which the request can proceed;

interjecting a hold on the erasure request of a specified time duration after which one or more control entities must again be surveyed; or allowing erasure by certain components, but not others.

16. The computer system of claim 10, further configured to determine how to handle the request by:

proceeding with the erasure request in its entirety unless at least one of the erasure control entity has responded within the specified time frame to indicate this should not occur.

17. The computer system of claim 10, further configured to further process the erasure request by:

transmitting a respective task to each component.

18. The computer system of claim 10, further configured to further process the erasure request by:

transmitting an erase user task to each component to erase data associated with the user ID; and transmitting a purge store task to each component to purge a store associated with the user ID.

19. The computer system of claim 10, further comprising the plurality of components.

20. The computer system of claim 10, further comprising the plurality of erasure control entities.

21. A non-transitory computer readable medium having computer executable instructions stored thereon that when executed by a processor cause the processor to perform a method comprising:

receiving an erasure request pertaining to a user identifier, to erase data in a system that maintains user data in a plurality of components;

making at least some details of the request available to at least one erasure control entity;

determining how to handle the request based on one or more responses received within a specified time frame from the at least one erasure control entity and a timestamp associated with the responses indicating when the request was received, wherein the specified time frame is measured relative to the timestamp and each of the responses is one of:

input received from the at least one erasure control entity; and lack of input received from the at least one erasure control entity; based on this determining, further processing the erasure request.

* * * * *

UNITED STATES PATENT AND TRADEMARK OFFICE
CERTIFICATE OF CORRECTION

PATENT NO. : 12,229,303 B2
APPLICATION NO. : 16/953535
DATED : February 18, 2025
INVENTOR(S) : Steven Scott et al.

It is certified that error appears in the above-identified patent and that said Letters Patent is hereby corrected as shown below:

In the Claims

At Column 30, Line 2, Claim 5, "the link available at least one" should be – the link available to at least one –;

At Column 30, Lines 20-21, Claim 7, "unless at least one of the erasure control entity has responded" should be – unless the at least one erasure control entity has responded –;

At Column 31, Line 41, Claim 14, "the link available at least one" should be – the link available to at least one –; and At Column 32, Lines 9-10, Claim 16, "unless at least one of the erasure control entity has responded" should be – unless the at least one erasure control entity has responded –.

Signed and Sealed this
First Day of April, 2025

Coke Morgan Stewart
*Acting Director of the United States Patent and Trademark Office*